United States Patent [19]

Evert

[11] 4,140,458
[45] Feb. 20, 1979

[54] APPARATUS FOR PRODUCING A CORRUGATED SHEET

[75] Inventor: Hans A. Evert, Fort Myers, Fla.

[73] Assignee: The Munters Corporation, Fort Myers, Fla.

[21] Appl. No.: 830,330

[22] Filed: Sep. 2, 1977

[51] Int. Cl.² ............................................. B29C 17/04
[52] U.S. Cl. ................................ 425/387.1; 425/388; 425/DIG. 48; 425/370; 264/286
[58] Field of Search ............... 425/369, 396, 370, 366, 425/373, 387.1, 388, DIG. 48, DIG. 60; 264/286

[56] References Cited

U.S. PATENT DOCUMENTS

| | | | |
|---|---|---|---|
| 3,038,198 | 6/1962 | Schaar | 425/387.1 X |
| 3,165,783 | 1/1965 | Martelli | 425/370 X |
| 3,343,220 | 9/1967 | Martinek | 264/286 X |
| 3,586,591 | 6/1971 | Munters et al. | 425/370 X |
| 3,819,453 | 6/1974 | Norback | 425/369 X |
| 3,942,934 | 3/1976 | Momiyama et al. | 425/387.1 X |

FOREIGN PATENT DOCUMENTS 2544372  4/1976  Fed. Rep. of Germany ........ 425/387.1

Primary Examiner—Robert L. Spicer, Jr.

[57] ABSTRACT

An apparatus for producing a corrugated sheet from a web of deformable material, for use in cooling towers and the like, includes an endless conveyor which is adapted to move along a predetermined path of travel and on which are mounted a plurality of web molding trays. The trays have a plurality of corrugations formed therein extending generally transversely of the path of travel and means are provided for selectively locking the trays on the conveyor with the corrugations located at predetermined acute angles with respect to the path of travel of the conveyor so that the angle of the corrugations formed in the web can be varied. An air knife arrangement is provided for urging the web against the corrugations in the trays to form the corrugations in the web.

17 Claims, 6 Drawing Figures

FIG.2

APPARATUS FOR PRODUCING A CORRUGATED SHEET

The present invention relates to apparatus for producing diagonally pleated or corrugated paper material and, in particular, to apparatus for forming corrugated sheets of material which are adapted to be used in contact or heat exchange bodies between two media, one of which may be a liquid such as water and the other a gas such as air.

Cooling towers, humidifiers and similar equipment used in air conditioning systems as well as in industrial heat exchangers and processing equipment, use contact bodies or packings which are formed of corrugated sheets of material with the sheets being positioned adjacent one another to form air flow passages therebetween. One type of preferred corrugated material for use in such packing bodies is the diagonal pleated or corrugated sheets of the type shown in U.S. Pat. No. 3,262,682 to Sven H. Bredberg, in which adjacent sheets are positioned such that the corrugations therein extend in a crosswise relationship to each other. Preferably the diagonally pleated or corrugated sheets are bonded together at their points of contact by a suitable adhesive to form the completed packing body.

The terms "diagonally pleated" or "corrugated", as used herein refer to the fact that the pleats or corrugations in the sheets of the packing body extend at an angle to the side edges of the sheet material. And, it is also to be understood that the term "sheet material" as used herein refers to any type of material suitable for use in the manufacture of this type of packing bodies, including paper webs, fibrous or cellulosic fiber material, as well as a variety of different plastic materials such as those known to artisans in the field.

Heretofore corrugations in this type of sheet material have been formed in machines such as shown in U.S. Pat. Nos. 5,586,591; 3,682,747; 3,470,280; and 3,819,453. In these apparatus, a frame is provided in which a plurality of removable trays are removably mounted on a pair of chains. The chains form an endless conveyer for transporting the trays.

The trays serve as a mold for the sheet material being formed and have corrugations formed therein at an angle to the sides of the tray. The angles at which the corrugation is formed are usually 15°, 30° or 45°. These trays are placed on the chains of the conveyor at one end of the frame and the web material is then placed down on the trays in longitudinal alignment therewith. The paper is pressed down against the trays to form the corrugations, which corrugations then have the same angle with respect to the side edges of the web as the angle of the corrugations in the trays with respect to the direction of travel of the trays. After the forming process is completed, along with the top flight of the conveyor, the trays are removed from the chain conveyors so that the chains can return along their lower flights to the beginning portion of the upper flight. As a result, relatively complicated mechanisms are required to place the trays on the chain conveyors, remove the trays from the end of the upper flight, and return them to the starting position. Moreover, because the angle of the corrugations in the trays is fixed with respect to the chain conveyors and their path of travel, the manufacturer must maintain a separate set of trays for each angle of corrugation which he desires to manufacture. Thus where the manufacturer typically manufactures sheet material having corrugations placed at angles of 15°, 30° and 45° with respect to the side edges of the sheet material, he must maintain three sets of trays in stock.

It is an object of the present invention to provide an apparatus which is adapted to form packing body sheets of a variety of different angles of corrugations, with the use of only one set of mold trays.

Another object of the present invention is to manufacture corrugated sheet material having the corrugations therein positioned at different angles to the side edges of the material with an apparatus having but one set of mold trays.

Another object of the present invention is to provide an apparatus for forming corrugations in sheet material, wherein the angle at which the corrugations is formed can be varied.

A still further object of the present invention is to provide an apparatus of the character described which is relatively simple in operation and durable in use.

In accordance with an aspect of the present invention an apparatus is provided for producing a corrugated sheet from a web of deformable material which includes an endless chain conveyor and means for moving the conveyor along a predetermined path of travel. A plurality of tray mounting blocks are mounted on the conveyor for movement therewith and a plurality of web molding trays are releasably mounted in at least some of the blocks. These trays have a plurality of corrugations formed therein extending generally transversely of the path of travel of the conveyor. The locking blocks and trays have cooperating means for selectively mounting the trays in the blocks in one of at least three determined angular positions relative to the path of travel of the conveyor, thereby to position the corrugations in the trays at selected angles with respect to that path of travel. By varying the angle of the tray corrugations with respect to the path of travel, corrugations of different angles will be formed in the sheet material which is placed on the trays as the conveyor moves along its path of travel. To aid in forming the corrugations an air knife is provided in the apparatus which supplies air under pressure against the sheet material, above the trays, to urge the sheet against the corrugations in the trays and thereby form corrugations in the sheet material.

The above, and other objects, features and advantages of this invention, will be apparent in the following detailed description of an illustrative embodiment thereof, which is to be read in connection with the accompanying drawings, wherein:

FIG. 2 is an elevational view of the apparatus shown in FIG. 1;

Figure 1:
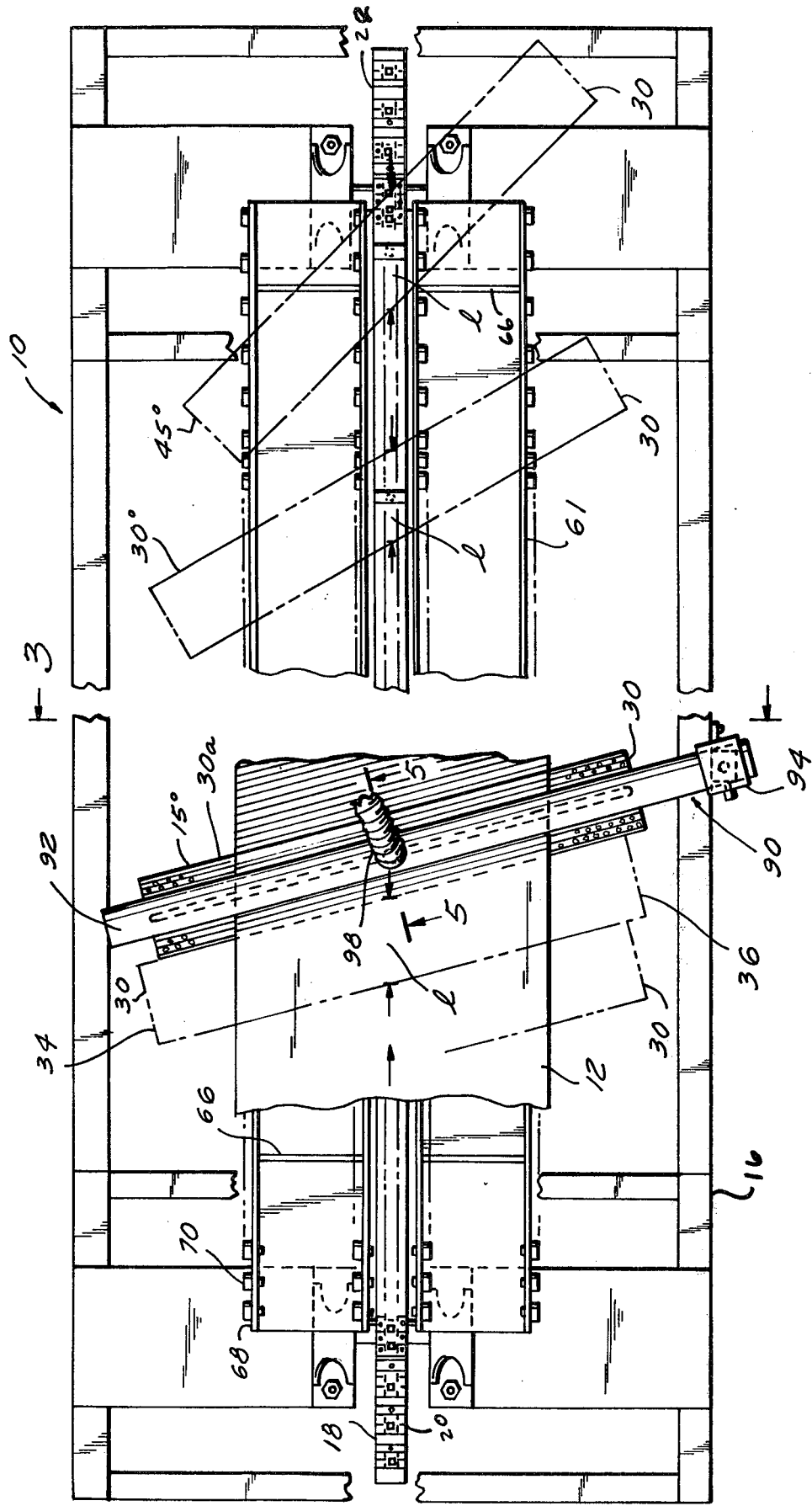
FIG. 1 is a plan view, with parts broken away, of a web forming apparatus constructed in accordance with the present invention.
Figure 2:
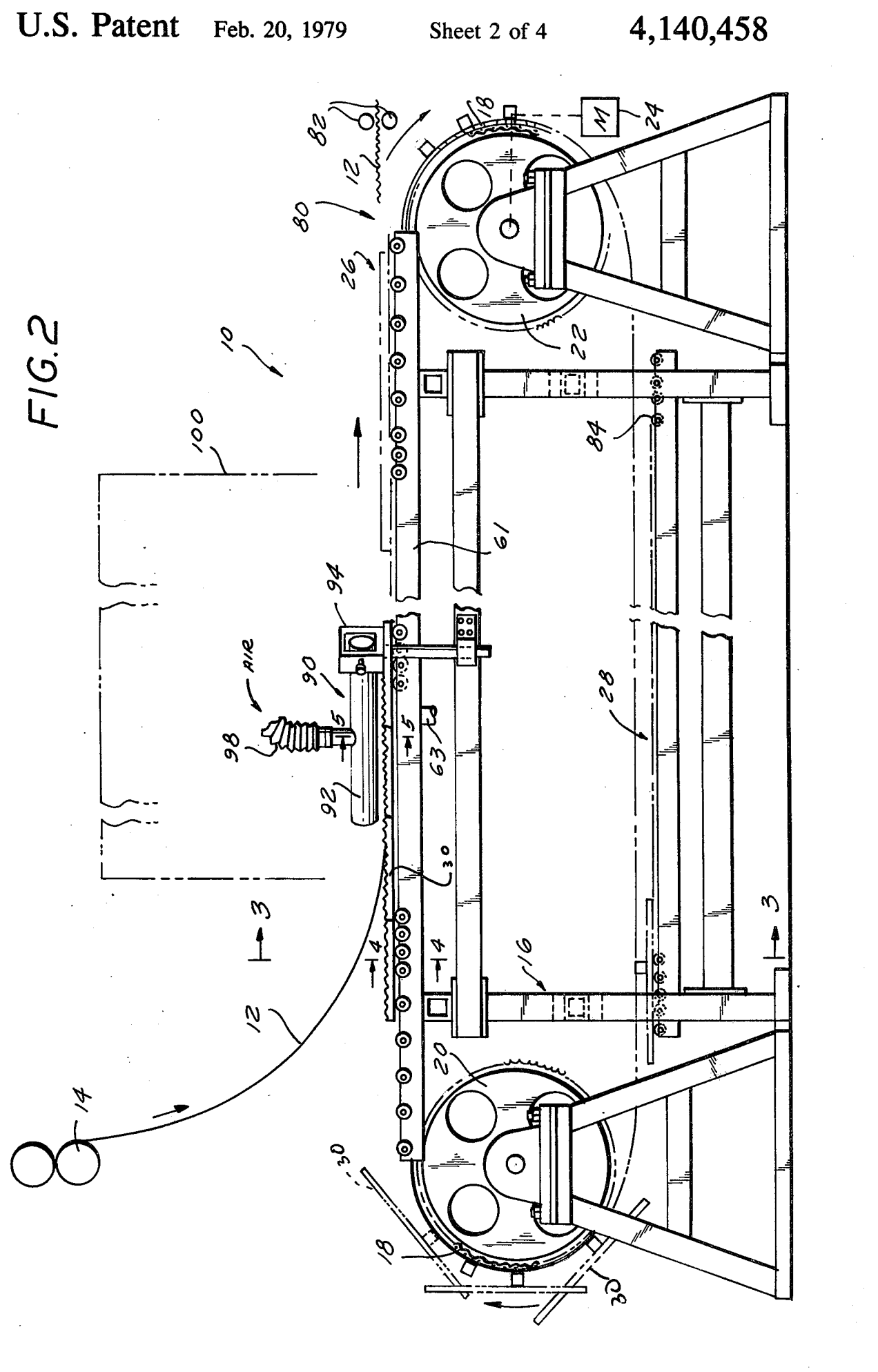

Referring now the drawing in detail, and initially to FIGS. 1 and 2 thereof, an apparatus 10, constructed in accordance with the present invention, is illustrated which is adapted to form corrugations in a sheet or web material 12, suitable for use in cooling towers and packing bodies, with the corrugations at an angle to the side edges of the sheet. The web material 12 is supplied in a continuous roll from a source 14 thereof in any convenient and conventional manner. As mentioned, this web may be formed of paper, asbestos sheeting, or plastic, as is commonly used for forming packing bodies.

Figure 6:
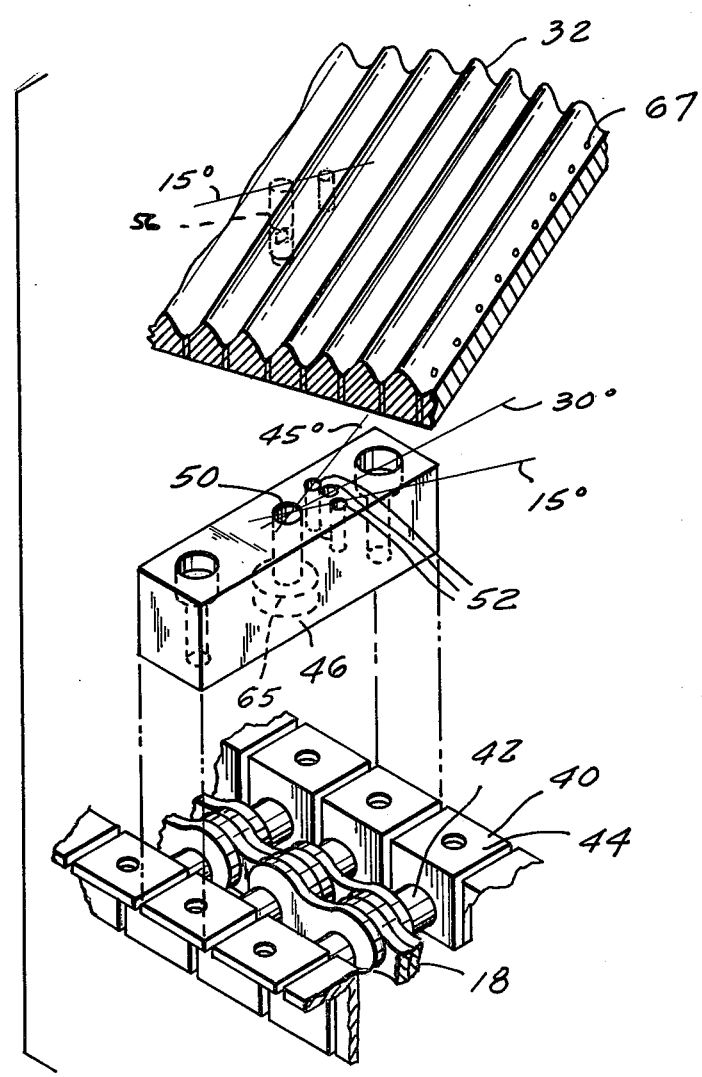
FIG. 6 is an exploded perspective view of the assembly illustrated in FIG. 4.

Apparatus 10 includes a frame 16 on which an endless chain conveyor 18 is mounted. Chain 18 extends over a sprocket 20 mounted at one end of frame 16 and a drive sprocket 22 mounted at the opposite or discharge end of the frame. Sprocket 22 is driven in any convenient manner by a motor 24 and drives the chain through a path of travel having upper flight 26 and lower flight 28. A plurality of corrugated trays 30 are mounted on chain 18 and these trays form the mold for the corrugations to be formed in the sheet material. In the illustrative embodiment of the invention, each tray 30 has a width of about 8 inches, with the corrugations (see FIG. 6) 32 formed therein extending from one side 34 to the other. The length of the trays is selected to be sufficient so that the tray ends extend beyond the width of the sheet material being molded on the trays, regardless of the angle at which the trays are placed, as described hereinafter.

Trays 30 are mounted on chain 18 to permit the angle of the trays with respect to the path of travel of the upper flight 18 of the conveyor to be adjusted, thereby to vary the angle of the corrugations with respect to that path of travel. By changing the angle of the corrugations with respect to the conveyor, the angle of the corrugations formed in sheet 12 with respect to the side edges of the web will also be changed.

Chain conveyor 18 is a roller type chain, of conventional, albeit, heavy construction, having mounting flanges 40 secured to the rollers or axles of the chains, in any convenient manner. These flanges have top edges 44 on which are mounted support blocks 46. The support blocks are secured to flanges 44 by bolts 48 or the like (see FIG. 4). These support blocks have a central pivot opening formed therein, as well as three angle selection openings 52, located in arcuately spaced relation to each other along radial lines from pivot apertures 50.

Tray 32 has a pivot pin 56 secured to its lower end and an angle selection pin 58 located in slightly spaced radial relation to pivot pin 56. When inserting pivot pin 56 in pivot aperture 50 and the angle selection pin 58 in one of the apertures 52, the angle of the corrugations 32 with respect to the path of travel of the conveyor chain is established. By moving the tray so that pin 58 is received in a different aperture 52, the angle of the corrugations with respect to the path of travel of the conveyor is changed. For example, when the pivot pin 58 is received in the forwardmost aperture of the block illustrated in FIG. 6 corrugations 32 will be positioned at an angle of 15° with respect to the path of travel of the conveyor chain 18; when it is in the middle aperture the angle of the corrugations will be 30° and when it is in the rearmost aperture the angle of the corrugations will be 45°. The angle of the corrugations to the path of travel of the conveyor will be the same as the resultant angle of the corrugations formed in the web 12 with respect to the side edges of the paper sheet.

In order to resist upward movement of the tray with respect to mounting block 46, pivot pin 58 is provided with a radial bore 60 which receives ball detent 62 biased outwardly by a spring 64. The outer edges of bore 60 are crimped to prevent the ball from leaving the bore but a portion of the ball extends beyond the periphery of the pivot pin beneath an annular shoulder 55 formed in block 46. The engagement of the projecting portion of the ball beneath shoulder 65 resists upward movement of the tray. However, by exerting a sufficient upwardly directed force on the tray, the ball will be urged upwardly in bore 60 by shoulder 65, and the tray can be removed from the block so that the position of pin 58 in the apertures 52 can be adjusted.

In the left half of the broken away drawing of FIG. 1 trays 30 are illustrated as positioned at their 15° angle to the path of travel of chain 18. These trays are positioned immediately adjacent each other so that their long sides 30a contact each other and form a continuous corrugated surface along the upper flight of the conveyor. At the right in FIG. 1, in phantom lines, the position of a tray 30 when placed at its 30° angle positioned at its 45° angle position is shown for illustrative purposes. In the presently preferred arrangement for the present invention, one hundred and thirty trays of 8" widths are used. Each tray is identical and mounted on the chain 18 in the same manner. However, because the effective length of the tray immediately above the chain at the pivot point varies depending upon the angle at which the tray is mounted in its associated supporting block, more supporting blocks are provided on the conveyor chain than trays so that the trays can be mounted in adjacent relation to each other at the different angular positions. Thus, mounting blocks 46 are positioned on chain 18 such that, starting from any given block, one block is located at every eight inches along the chain to accommodate the trays in their 15° angular position. In addition, blocks are provided along the chain at every nine inches to accommodate the trays at the 30° angle position; and blocks are located at every eleven inches along the chain to accommodate the 45° angle position. Of course, with an extremely long conveyor, many of the blocks on the chain will serve to mount the trays in more than one of the angular positions. This is a result of the dimensioning of the trays 30 such that their width forms the hypotenuse of a right triangle in each of the three positions having a dimension which is divisible by 1", i.e. the hypotenuse defined by the distance L (see FIG. 1) in each position is a multiple of 1".

Frame 16 includes along its upper side immediately below the upper flight 26 of chain 18, a vacuum box 61. This box has an open top located immediately below the path of travel of trays 30 and is connected by a conduit 62 or the like to a source of suction. Trays 30 have perforations 64 formed therein through the valleys of the corrugations, so that the suction applied to the box 61 is applied through these perforations to sheet 12 laid down on the of the trays. The ends of the box 60 are closed by walls 66, as seen in FIGS. 1 and 2.

Figure 4:
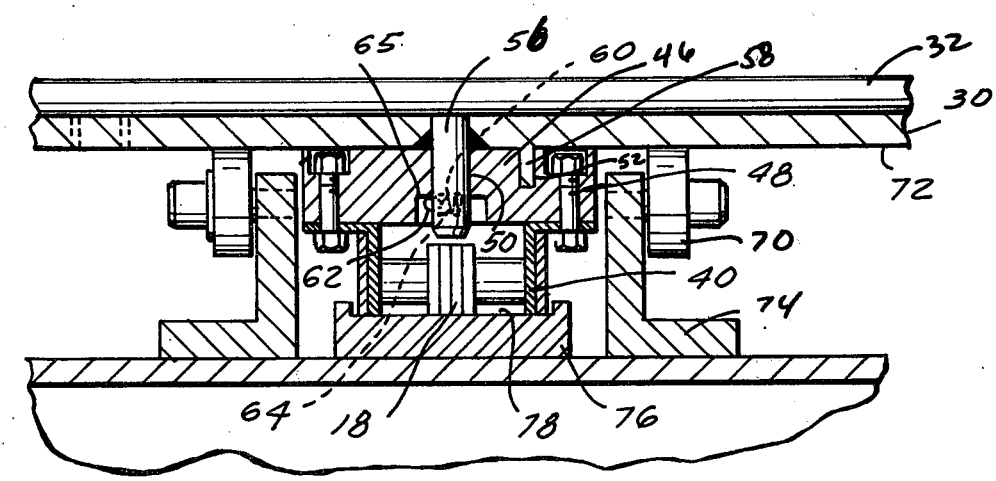
FIG. 4 is an enlarged sectional view taken along line 4—4 of FIG. 2, illustrating the connection of the trays to the conveyor chain.

The side walls 68 of vacuum box 61 are provided with a multiplicity of rollers 70 along their length which are located in closely spaced relation to each other in order to contact the lower surface 72 of trays 30 and support them along the outside of the vacuum box as they travel along the upper flight of the conveyor. In addition, the box contains a central guide track 74 on which additional ball bearing type rollers 70 are mounted for providing central support to the tray. This guide track, as seen in FIG. 4, includes a central guide strip 76 which has a channel 78 formed therein in which the chain 18 and mounting plates 40 ride. This arrangement insures that the trays are held in a relatively flat planar position as they move with chain 18 along the top flight of the conveyor.

At the right or discharge end 80 of apparatus 10, as seen in FIG. 2, corrugated sheet 12 is removed from the apparatus by a pair of pull rollers 82 or the like in any convenient manner. The web may then be cut into sheets or rolled into a roll for storage. However, trays 30 remain connected to chain 18 and pass about drive sprocket 22 to the lower flight 26 of the conveyor. Along the lower flight of the conveyor trays 30 are supported on elongated support rollers 84 rotatably mounted in the frame, as illustrated in FIG. 2. These rollers support the weight of the trays and eliminate excessive stress on chain 18 as a result of the weight of the relatively large trays.

Figure 3:
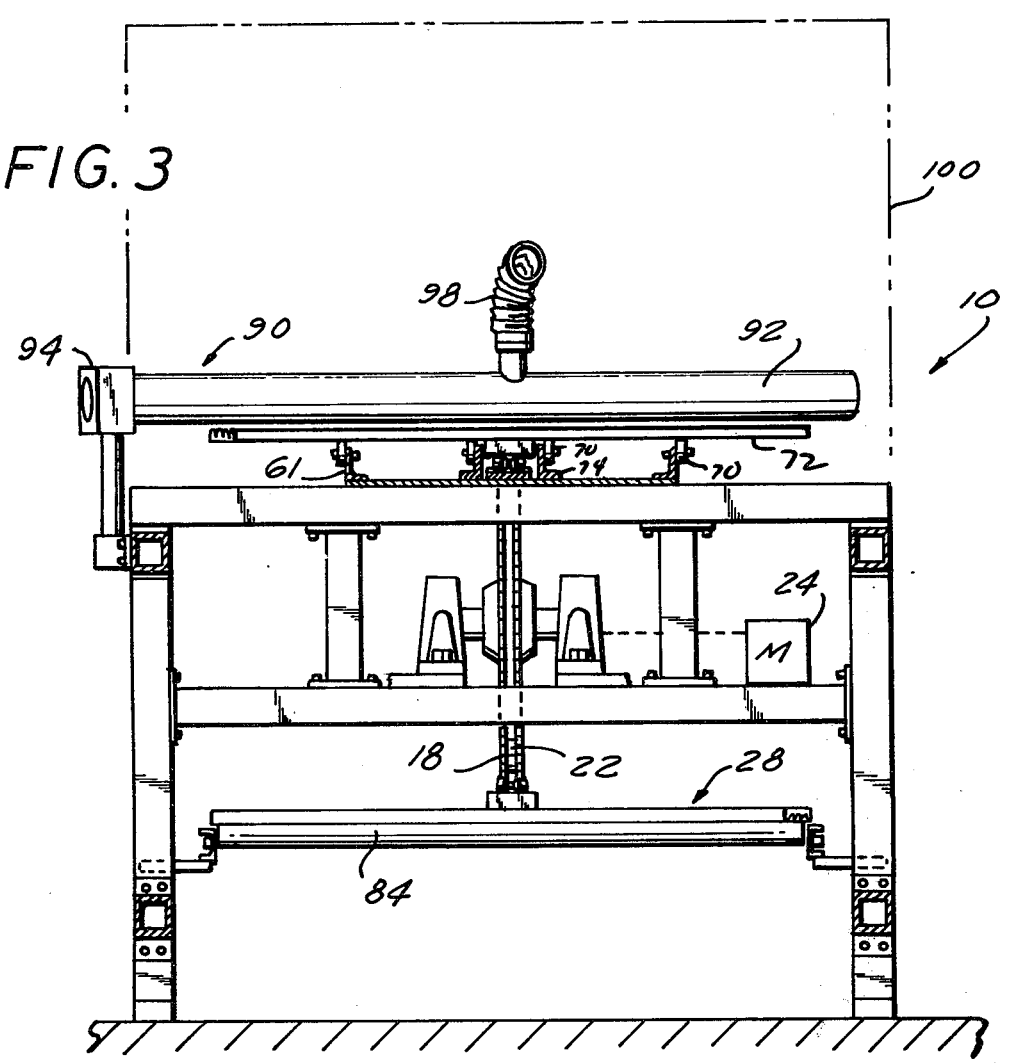
FIG. 3 is a sectional view taken along line 3—3 of FIG. 2.
Figure 5:
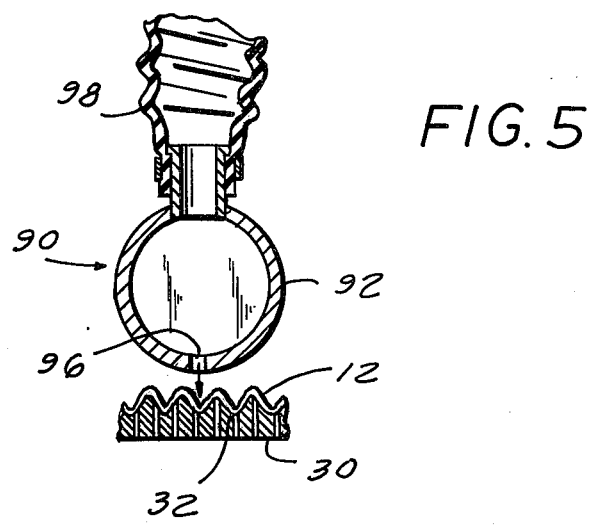
FIG. 5 is an enlarged sectional view taken along line 5—5 of FIG. 2 illustrating the air knife arrangement.

In order to form the corrugations in the web 12 any suitable arrangement for depressing the sheet against the corrugations of the trays can be used. Thus an arrangement such as shown for example in U.S. Pat. No. 3,586,591 using a plurality of battens pressed into the corrugations could be used. However, in accordance with a presently preferred embodiment of the present invention an air knife 90 is used adjacent the point on conveyor 18 at which sheet 12 is supplied to the apparatus. This air knife is illustrated in detail in FIGS. 3 and 5 and consists of an elongated tube 92 mounted on the apparatus 10 by a support bracket 94. The tube 92 has an elongated slot 96 formed along its lower side (alternately a plurality of closely spaced apertures could be provided) and is connected by a conduit 98 to a source of pressurized air (not shown). During the operation of the device air is supplied through conduit 98 to tube 92 which distributes the air through slot 96 to the surface of web 12 placed on trays 30. The pressurized air urges the wet sheet material into the corrugations 32 of the trays to form the corrugations therein. The conveyor then carries the sheet on the trays through a drying chamber 100 of conventional construction, to set the corrugations and dry the sheet material.

Accordingly, it is seen that a relatively simple apparatus is provided for forming diagonal corrugations or pleats in a web material, which has a minimum of parts, and which keeps the molds or trays for forming the corrugations connected to the conveying apparatus at all times during the forming process. Moreover, the apparatus is designed to cooperate with the air knife structure, so that no physical contact between battens or other mold members is required in order to urge the web into the corrugations of the trays. And, a single set of trays is used to form corrugations of different angles in the web material.

Although an illustrative embodiment of the present invention has been described herein with reference to the accompanying drawings, it is to be understood that the invention is not limited to that precise embodiment, and that various changes and modifications can be effected therein by one skilled in the art without departing from the scope or spirit of this invention.

I claim:

1. An apparatus for producing a corrugated sheet from a web of deformable material comprising an endless conveyor adapted to move along a predetermined path of travel, a plurality of web molding trays removably mounted on said conveyor, said molding trays having a plurality of corrugations formed therein extending generally transversely of said path of travel, means for selectively locking said trays on said conveyor with said corrugations located at a predetermined acute angle to said path of travel, said locking means comprising means for selectively varying the angular position of the trays with respect to the path of travel of the conveyor thereby to vary the angle between the corrugations and the conveyor's path of travel, and means cooperating with said trays for urging said web against corrugations in the trays to form corrugations in said web; whereby the angle of the corrugations to be formed in the deformable material can be selectively varied while using the same trays.

2. Apparatus as defined in claim 1 wherein said cooperating means comprises means positioned above said path of travel for directing air under pressure towards said trays against said web.

3. Apparatus as defined in claim 1 including a hollow chamber located below said path of travel having an open top adjacent said trays and means for producing a vacuum in said chamber, said trays having perforations formed therein whereby said vacuum holds said web against said trays.

4. An apparatus for producing a corrugated sheet from a web of deformable material comprising an endless conveyor adapted to move along a predetermined path of travel, a plurality of web molding trays removably mounted on said conveyor, said molding trays having a plurality of corrugations formed therein extending generally transversely of said path of travel, means for selectively locking said trays on said conveyor with said corrugations located at a predetermined acute angle to said path of travel and means cooperating with said trays for urging said web against the corrugations in the trays to form corrugations in said web; said endless conveyor comprising a chain and said locking means comprising a plurality of locking blocks mounted along the chain in predetermined spaced locations, said blocks each having a pivot opening and a plurality of angle selection apertures formed therein, and said trays each having a pivot pin adapted to be received in said pivot opening and an angle selection pin adapted to be selectively received in said angle selection aperture to establish the angle between the corrugations of the tray and said path of travel.

5. Apparatus as defined in claim 4 wherein said locking blocks each has a spring biased detent formed therein projecting generally perpendicularly into said pivot opening and said pivot pins each have an annular recess formed therein cooperating with said detent to resist upward movement of the tray with respect to said chain.

6. Apparatus as defined in claim 4 including roller support means for supporting said trays as they move with said chain along said path of travel.

7. An apparatus for producing a corrugated sheet from a web of deformable material comprising an endless conveyor, means for moving said conveyor along a predetermined path of travel, a plurality of tray mounting blocks mounted on said conveyor for movement therewith, and a plurality of web molding trays releasably mounted in at least some of said blocks, said trays each having a plurality of corrugations formed therein extending generally transversely of said path of travel, said locking blocks and trays having cooperating means for selectively mounting said trays in said blocks in one of at least three predetermined angular positions relative to said path of travel to position said corrugations at a selected angle with respect to said path of travel; said mounting means comprising means for selectively varying the angular position of the trays with respect to said path of travel whereby the same trays may be used to form corrugations of varying angles in the deformable material.

8. An apparatus as defined in claim 7 including means for urging said web against said corrugations in the trays to form corrugations in said web.

9. An apparatus as defined in claim 8 including a hollow chamber having an open top positioned in the apparatus with said open top adjacent a portion of the path of travel of said trays, said trays having a plurality of apertures formed therein and means for producing a vacuum in said chamber, whereby said vacuum holds said web against said trays.

10. An apparatus as defined in claim 9 wherein said urging means comprises means positioned adjacent said path of travel for directing air under pressure towards the sides of said trays opposite said chamber to urge said web against the corrugations of the trays where it is held by said vacuum.

11. An apparatus for producing a corrugated sheet from a web of deformable material comprising an endless conveyor, means for moving said conveyor along a predetermined path of travel, a plurality of tray mounting blocks mounted on said conveyor for movement therewith, and a plurality of web molding trays releasably mounted in at least some of said blocks, said trays each having a plurality of corrugations formed therein extending generally transversely of said path of travel, said locking blocks and trays having cooperating means for selectively mounting said trays in said blocks in one of at least three predetermined angular positions relative to said path of travel to position said corrugations at a selected angle with respect to said path of travel; said cooperating means including a pivot pin and an angle selection pin mounted on one side of each of said trays in slightly spaced radially aligned positions and a pivot aperture and a plurality of angle selection apertures formed in said mounting blocks, said angle selection apertures being arcuately spaced from each other at predetermined distances in radial positions with respect to said pivot aperture, said pivot aperture being dimensioned to receive the pivot pin of a tray and said angle selection apertures being dimensioned to receive said angle selection pin whereby the angle of said corrugations with respect to said path of travel can be selected by inserting the angle selection pin in one of said angle selection apertues.

12. An apparatus as defined in claim 11 wherein said locking blocks each has a spring biased detent formed therein projecting generally perpendicularly into said pivot opening and said pivot pins each have an annular recess formed therein cooperating with said detent to resist upward movement of the tray with respect to said chain.

13. An apparatus as defined in claim 12 including roller support means for supporting said trays as they move with said chain along said path of travel.

14. An apparatus as defined in claim 13 wherein said conveyor has upper and lower flights and said apparatus includes a guide track for guiding said conveyor along said upper flight; said guide rollers including a plurality of rollers located on opposite sides of said track for engaging and supporting the lower side of said trays with respect to said conveyor.

15. An apparatus as defined in claim 14 wherein said guide rollers include a plurality of elongated rollers positioned below said lower conveyor flight for engaging and supporting the opposite side of said trays.

16. An apparatus as defined in claim 15 including a hollow chamber having an open top surrounding said guide track and positioned with its opened top adjacent said lower side of said trays, said trays having a plurality of apertures formed therein and means for producing a vacuum in said chamber whereby said vacuum holds said web against said trays.

17. An apparatus as defined in claim 16 including means for urging said web against said corrugations in the trays to form corrugations in said web.

* * * * *